(12) United States Patent
Hirata (10) Patent No.: US 11,460,682 B2
(45) Date of Patent: Oct. 4, 2022

(54) OBSERVATION DEVICE

(71) Applicant: Evident Corporation, Nagano (JP)

(72) Inventor: Tadashi Hirata, Tokyo (JP)

(73) Assignee: EVIDENT CORPORATION, Nagano (JP)

(*) Notice: Subject to any disclaimer, the term of this patent is extended or adjusted under 35 U.S.C. 154(b) by 244 days.

(21) Appl. No.: 16/689,671

(22) Filed: Nov. 20, 2019

(65) Prior Publication Data

US 2020/0088985 A1    Mar. 19, 2020

Related U.S. Application Data

(63) Continuation of application No. PCT/JP2017/019895, filed on May 29, 2017.

(51) Int. Cl.
*G02B 21/00* (2006.01)
*G02B 21/06* (2006.01)
*G02B 21/14* (2006.01)

(52) U.S. Cl.
CPC ......... *G02B 21/14* (2013.01); *G02B 21/0032* (2013.01); *G02B 21/06* (2013.01)

(58) Field of Classification Search
CPC ............. G02B 21/00; G02B 21/0032; G02B 21/0056; G02B 21/02; G02B 21/06;
(Continued)

(56) References Cited

U.S. PATENT DOCUMENTS 3,437,395 A    4/1969   Rosenberger et al.
4,621,911 A    11/1986  Lanni et al.
(Continued)

FOREIGN PATENT DOCUMENTS

CN    105264358 A    1/2016
EP    1 553 166 A1   7/2005
(Continued)

OTHER PUBLICATIONS

U.S. Office Action dated Sep. 29, 2021 received in U.S. Appl. No. 16/360,205.
(Continued)

*Primary Examiner* — Thong Q Nguyen
(74) *Attorney, Agent, or Firm* — Scully, Scott, Murphy & Presser, P.C.

(57) ABSTRACT

An observation device includes: an illumination optical system configured to emit illumination light to above a sample from below; and an objective optical system configured to acquire an image of transmitted light below the sample in a path different from a path for the illumination optical system, the transmitted light resulting from the illumination light that has been emitted from the illumination optical system, that has been reflected above the sample, and that has passed through the sample. The objective optical system includes, in the vicinity of a pupil plane, a pupil modulation element that partially decreases transmittance and that modulates the phase of light, and the illumination optical system includes a light source, and an illumination-region restricting section configured to restrict light from the light source to a particular emission region.

12 Claims, 11 Drawing Sheets

(58) Field of Classification Search
CPC .. G02B 21/084; G02B 21/086; G02B 21/088;
G02B 21/10; G02B 21/12; G02B 21/125;
G02B 21/14; G02B 5/00; G02B 5/003;
G02B 5/005; G02B 5/20
USPC .................. 359/368, 385, 387–388, 738
See application file for complete search history.

(56) References Cited

U.S. PATENT DOCUMENTS

| | | | |
|---|---|---|---|
| 4,969,037 A | 11/1990 | Poleschinski et al. | |
| 5,038,258 A | 8/1991 | Koch et al. | |
| 5,751,475 A | 5/1998 | Ishiwata et al. | |
| 6,025,956 A | 2/2000 | Nagano et al. | |
| 6,674,575 B1 | 1/2004 | Tandler et al. | |
| 6,795,239 B2 | 9/2004 | Tandler et al. | |
| 8,947,519 B2 | 2/2015 | Tsujimoto et al. | |
| 9,404,074 B2 | 8/2016 | Kiyota | |
| 9,766,445 B2 | 9/2017 | Kei et al. | |
| 10,281,704 B2 | 5/2019 | Takahashi et al. | |
| 10,877,256 B2 * | 12/2020 | Hirata | G02B 21/24 |
| 10,914,931 B2 * | 2/2021 | Hirata | G02B 21/06 |
| 11,016,279 B2 * | 5/2021 | Hirata | G02B 21/14 |
| 11,150,456 B2 * | 10/2021 | Hirata | G02B 3/08 |
| 2001/0028497 A1 | 10/2001 | Uhl | |
| 2002/0191281 A1 | 12/2002 | Osa et al. | |
| 2003/0165011 A1 | 9/2003 | Tandler et al. | |
| 2004/0113043 A1 | 6/2004 | Osa et al. | |
| 2005/0105172 A1 | 5/2005 | Hasegawa et al. | |
| 2006/0072190 A1 | 4/2006 | Okugawa et al. | |
| 2007/0177255 A1 | 8/2007 | Kanegasaki et al. | |
| 2008/0201083 A1 | 8/2008 | Hata et al. | |
| 2008/0291534 A1 | 11/2008 | Okugawa | |
| 2009/0051901 A1 | 2/2009 | Shen et al. | |
| 2009/0093046 A1 | 4/2009 | Kiyota | |
| 2010/0208053 A1 | 8/2010 | Hasegawa et al. | |
| 2011/0089339 A1 | 4/2011 | Yamashita et al. | |
| 2013/0033744 A1 | 2/2013 | Fölling et al. | |
| 2013/0130307 A1 | 5/2013 | Sugiyama et al. | |
| 2013/0156287 A1 | 6/2013 | Houjou et al. | |
| 2013/0229707 A1 | 9/2013 | Sakaguchi | |
| 2014/0015954 A1 | 1/2014 | Tsujimoto et al. | |
| 2014/0030737 A1 | 1/2014 | Holmes et al. | |
| 2014/0038206 A1 | 2/2014 | Holmes et al. | |
| 2014/0126049 A1 | 5/2014 | Yamamoto | |
| 2014/0193892 A1 | 7/2014 | Mohan et al. | |
| 2014/0273188 A1 | 9/2014 | Mohan et al. | |
| 2014/0333997 A1 | 11/2014 | Oda | |
| 2014/0340476 A1 | 11/2014 | Sun et al. | |
| 2015/0031051 A1 | 1/2015 | Mohan et al. | |
| 2015/0131142 A1 | 5/2015 | Matsumoto et al. | |
| 2015/0204788 A1 | 7/2015 | Pangarkar et al. | |
| 2015/0253561 A1 | 9/2015 | Lee et al. | |
| 2015/0264235 A1 | 9/2015 | Houjou et al. | |
| 2015/0362716 A1 | 12/2015 | Kei et al. | |
| 2016/0048011 A1 | 2/2016 | Suzuki et al. | |
| 2016/0249810 A1 | 9/2016 | Darty et al. | |
| 2016/0376540 A1 | 12/2016 | Kiyota | |
| 2017/0023478 A1 | 1/2017 | Holmes et al. | |
| 2017/0115289 A1 | 4/2017 | Holmes et al. | |
| 2017/0146447 A1 | 5/2017 | Mohan et al. | |
| 2017/0261732 A1 | 9/2017 | Takahashi et al. | |
| 2017/0355949 A1 | 12/2017 | Hirata et al. | |
| 2018/0252648 A1 | 9/2018 | Dohi | |
| 2018/0267285 A1 | 9/2018 | Hirata et al. | |
| 2018/0329193 A1 | 11/2018 | Hirata et al. | |
| 2018/0346868 A1 | 12/2018 | Blanchard | |
| 2019/0218500 A1 | 7/2019 | Takimoto et al. | |
| 2019/0219808 A1 | 7/2019 | Takahashi et al. | |
| 2019/0219809 A1 | 7/2019 | Mochizuki et al. | |
| 2019/0219810 A1 | 7/2019 | Mizunaka et al. | |
| 2019/0339271 A1 | 11/2019 | Mohan et al. | |
| 2020/0103406 A1 | 4/2020 | Holmes et al. | |
| 2020/0318058 A1 | 10/2020 | Mochizuki et al. | |
| 2021/0261903 A1 | 8/2021 | Blanchard | |

FOREIGN PATENT DOCUMENTS

| | | |
|---|---|---|
| EP | 1615061 A1 | 1/2006 |
| EP | 1 630 586 A1 | 3/2006 |
| EP | 2312367 A1 | 4/2011 |
| EP | 2562245 A1 | 2/2013 |
| EP | 2955502 A1 | 12/2015 |
| EP | 3 211 469 A1 | 8/2017 |
| EP | 3 279 713 A1 | 2/2018 |
| EP | 3 521 410 A1 | 8/2019 |
| EP | 3 521 893 A1 | 8/2019 |
| GB | 2512793 A | 10/2014 |
| JP | S57-178212 A | 11/1982 |
| JP | H02-232614 A | 9/1990 |
| JP | H02-272412 A | 11/1990 |
| JP | H06-217989 A | 8/1994 |
| JP | 7-261089 A | 10/1995 |
| JP | H09-179034 A | 7/1997 |
| JP | 2000-327483 A | 11/2000 |
| JP | 2001-025387 A | 1/2001 |
| JP | 2001-166219 A | 6/2001 |
| JP | 2003-021628 A | 1/2003 |
| JP | 2004-070276 A | 3/2004 |
| JP | 2004-318185 A | 11/2004 |
| JP | 2004-348104 A | 12/2004 |
| JP | 2004-361485 A | 12/2004 |
| JP | 2005-010258 A | 1/2005 |
| JP | 2005-326495 A | 11/2005 |
| JP | 2005-331623 A | 12/2005 |
| JP | 2006-030583 A | 2/2006 |
| JP | 2006-174764 A | 7/2006 |
| JP | 2006-179387 A | 7/2006 |
| JP | 2007-264410 A | 10/2007 |
| JP | 2007-323094 A | 12/2007 |
| JP | 2008-092882 A | 4/2008 |
| JP | 2008-209726 A | 9/2008 |
| JP | 2009-106305 A | 5/2009 |
| JP | 2009-109566 A | 5/2009 |
| JP | 2009-217222 A | 9/2009 |
| JP | 2010-085705 A | 4/2010 |
| JP | 2011-008188 A | 1/2011 |
| JP | 2011-101617 A | 5/2011 |
| JP | 2011-102970 A | 5/2011 |
| JP | 2011-141444 A | 7/2011 |
| JP | 2013-521522 A | 6/2013 |
| JP | 2013-152454 A | 8/2013 |
| JP | 2013-238797 A | 11/2013 |
| JP | 2015-084059 A | 4/2015 |
| JP | 2016-000007 A | 1/2016 |
| JP | 6066110 B2 | 1/2017 |
| JP | 2018-72845 A | 5/2018 |
| KR | 100813915 B1 | 3/2008 |
| WO | 2004/109361 A1 | 12/2004 |
| WO | 2006/101056 A1 | 9/2006 |
| WO | 2011/115189 A1 | 9/2011 |
| WO | 2011/132586 A1 | 10/2011 |
| WO | 2012/029817 A1 | 3/2012 |
| WO | 2013/047315 A1 | 4/2013 |
| WO | 2013/100025 A1 | 7/2013 |
| WO | 2013/157606 A1 | 10/2013 |
| WO | 2014/018805 A2 | 1/2014 |
| WO | 2014/038871 A1 | 3/2014 |
| WO | 2014/041820 A | 3/2014 |
| WO | 2014/127372 A2 | 8/2014 |
| WO | 2016/158780 A1 | 10/2016 |
| WO | 2016/158782 A1 | 10/2016 |
| WO | 2018/061951 A1 | 4/2018 |
| WO | 2018/062215 A1 | 4/2018 |

OTHER PUBLICATIONS

Japanese Office Action dated Feb. 9, 2021 received in J.P. Patent Application No. 2019-521536, 5 pages.
Extended European Search Report dated Mar. 12, 2020 received in 17855906.8-1132/3521410 PCT/JP2017033979.
Japanese Office Action dated Jun. 8, 2021 received in 2018-542613.
International Search Report and Written Opinion dated Dec. 26, 2017 received in PCT/JP2017/033979.

(56) References Cited

OTHER PUBLICATIONS

International Search Report and Written Opinion dated Jan. 9, 2018 received in PCT/JP2017/034826.
U.S. Office Action dated Jun. 2, 2021 received in U.S. Appl. No. 16/360,205.
U.S. Office Action dated Apr. 22, 2021 received in U.S. Appl. No. 16/364,946.
Lugmaier, R.A. et al., "Phase contrast and DIC illumination for AFM hybrids", ULTRAMICROSCOPY, 04, No. 3-4, pp. 255-260, ISSN: 0304-3991 (Oct. 2, 2005).
Ford, T.N. et al., "Phase-gradient microscopy in thick tissue with oblique back-illumination", Nature Methods, vol. 9, No. 12, pp. 1195-1197, ISSN: 1548-7091 (Oct. 28, 2012 published online).
Webb, K. F. et al., "Condenser-free contrast methods for transmitted-light microscopy: Condenser-free contrast methods", Journal of Microscopy, vol. 257, No. 1, pp. 8-22, ISSN: 0022-2720 (Sep. 16, 2014).
Extended Supplementary European Search Report dated Dec. 19, 2017 in European Patent Application No. 16 77 2661.1.
Extended Supplementary European Search Report dated Oct. 29, 2018 in European Patent Application No. 16 77 2663.7.
Japanese Office Action dated Dec. 3, 2019 in Japanese Patent Application No. 2017-225493.
Chinese Office Action dated Dec. 27, 2019 in Chinese Patent Application No. 201580085163.7.
Office Action dated Sep. 7, 2018 received in U.S. Appl. No. 15/607,666.
Office Action dated Feb. 21, 2019 received in U.S. Appl. No. 15/690,024.
Office Action dated Apr. 6, 2020 received in U.S. Appl. No. 15/984,949.
Office Action dated May 18, 2020 received in U.S. Appl. No. 16/003,402.
International Search Report dated Mar. 22, 2016 together with the Written Opinion received in related International Application No. PCT/JP2015/085479.
International Search Report dated Jun. 21, 2016 together with the Written Opinion received in related International Application No. PCT/JP2016/059686.
International Search Report dated Jun. 28, 2016 together with the Written Opinion received in related International Application No. PCT/JP2016/059694.
International Search Report dated Dec. 19, 2017 together with the Written Opinion received in related International Application No. PCT/JP2017/033820.
International Search Report dated Mar. 22, 2016 together with the Written Opinion received in related International Application No. PCT/JP2015/084805.
Written Opinion received in related International Application No. PCT/JP2017/019895.
International Search Report dated Aug. 29, 2017 received in PCT/JP2017/019895.
U.S. Office Action dated Mar. 15, 2022 received in U.S. Appl. No. 16/360,205.

\* cited by examiner

FIG. 16

OBSERVATION DEVICE

CROSS-REFERENCE TO RELATED APPLICATIONS

This is a continuation of International Application PCT/JP2017/019895 which is hereby incorporated by reference herein in its entirety.

TECHNICAL FIELD

The present invention relates to observation devices.

BACKGROUND ART

As devices for observing subjects, such as cells, without labelling, there are well-known observation devices that use a phase-contrast observation method or a differential-interference observation method (refer to, for example, PTL 1).

CITATION LIST

Patent Literature

{PTL 1}
Japanese Unexamined Patent Application, Publication No. 7-261089

SUMMARY OF INVENTION

One aspect of the present invention is an observation device including: an illumination optical system configured to emit illumination light to above a sample from below; and an objective optical system configured to acquire an image of transmitted light below the sample in a path different from a path for the illumination optical system, the transmitted light resulting from the illumination light that has been emitted from the illumination optical system, that has been reflected above the sample, and that has passed through the sample, wherein the objective optical system includes, in the vicinity of a pupil plane, a pupil modulation element that partially decreases transmittance and that modulates the phase of light, and the illumination optical system includes a light source, and an illumination-region restricting section configured to restrict light from the light source to a particular emission region.

DESCRIPTION OF EMBODIMENTS

An observation device 1 according to a first embodiment of the present invention will now be described with reference to the drawings.

Figure 1:
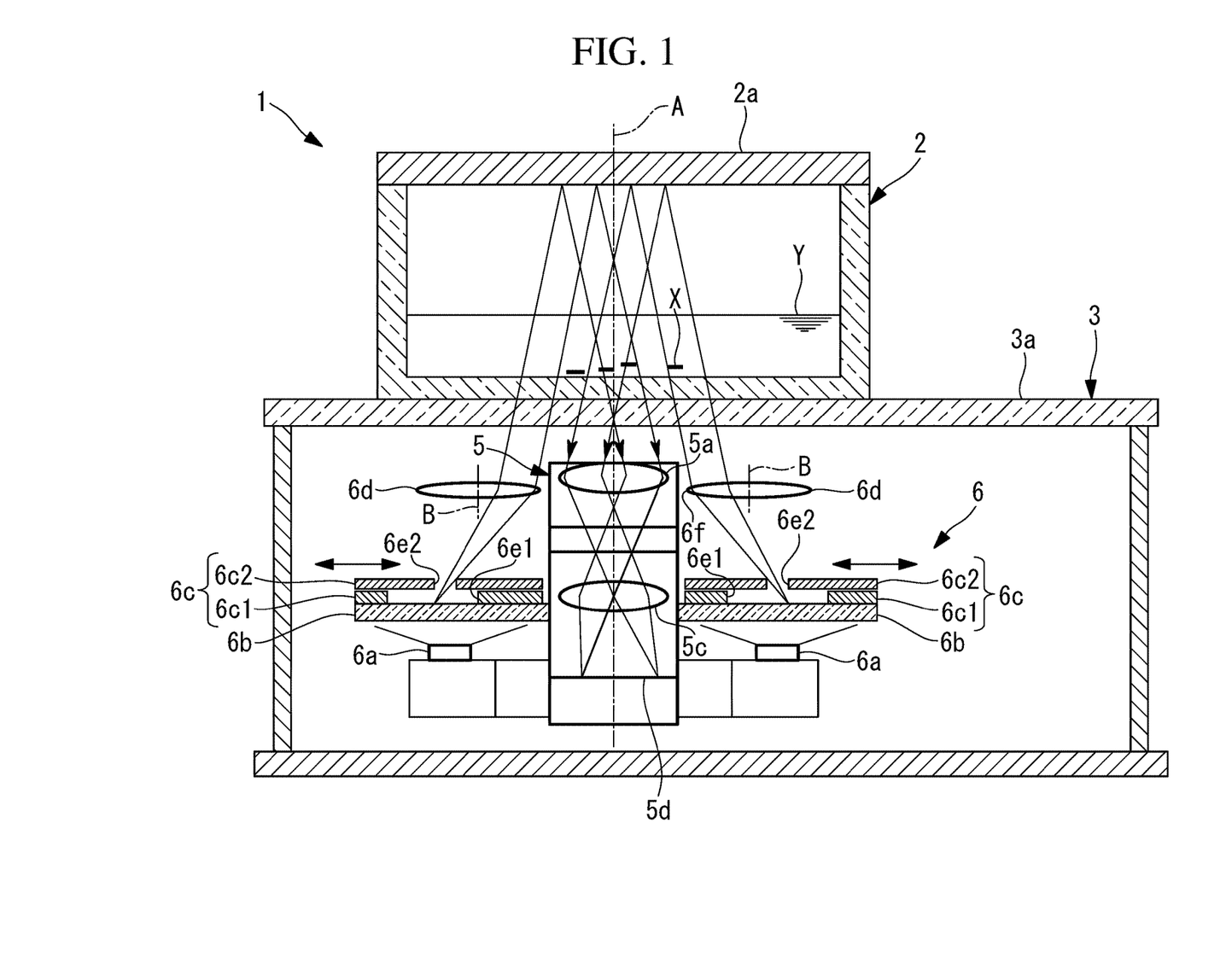
FIG. 1 is a longitudinal sectional view showing an observation device according to a first embodiment of the present invention.

As shown in FIG. 1, the observation device 1 according to this embodiment includes: a stage 3 on which a container 2 for accommodating a sample X, such as cells, is placed; an objective optical system 5 that is disposed below this stage 3, that includes an objective lens 5a for collecting light coming through the stage 3 from thereabove, and that acquires an image of the light having passed through the sample X; an illumination optical system 6 that is disposed radially outward of the objective optical system 5 and that emits illumination light upward through the stage 3 along paths different from the paths for the objective optical system 5; and a control unit (not shown in the figure) for controlling the illumination optical system 6.

The stage 3 includes a placement table 3a that is formed of an optically transparent material, such as glass, and that covers the space above the objective optical system 5 and the illumination optical system 6. The container 2 is placed on the upper surface of the placement table 3a.

The container 2 is, for example, a cell culture flask having a top plate 2a and is entirely formed of an optically transparent resin.

Figure 2:
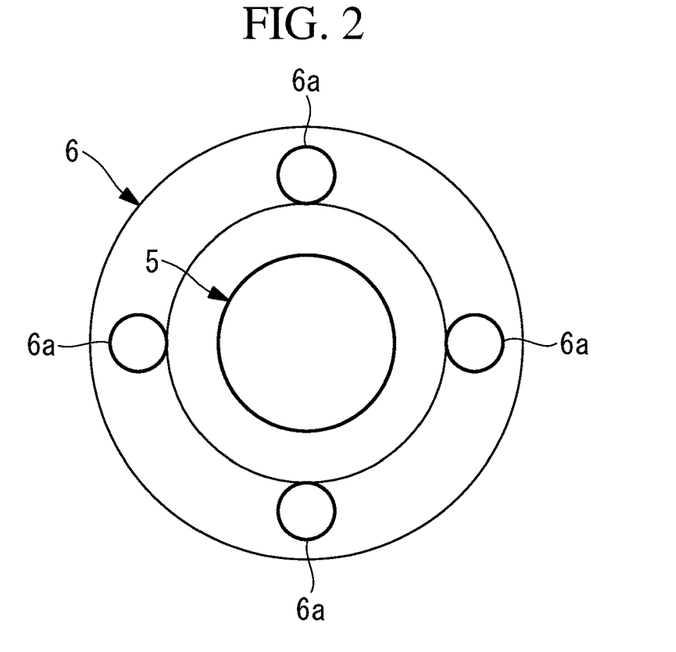
FIG. 2 is a plan view showing an example of the arrangement of light sources included in the observation device in FIG. 1.

As shown in FIG. 2, the illumination optical system 6 includes: four LED light sources (light sources) 6a that are arranged at equally-spaced intervals outside the objective optical system 5 along the circumferential direction thereof; a light-diffusing plate 6b for diffusing light from each of the LED light sources 6a; a mask 6c that is provided near the light-diffusing plates 6b and that restricts, to particular emission regions, the illumination light from the LED light sources 6a; and collimating lenses 6d for converting, to substantially collimated light, the illumination light that is emitted from the restricted emission regions in a progressively diffused manner.

Figure 3:
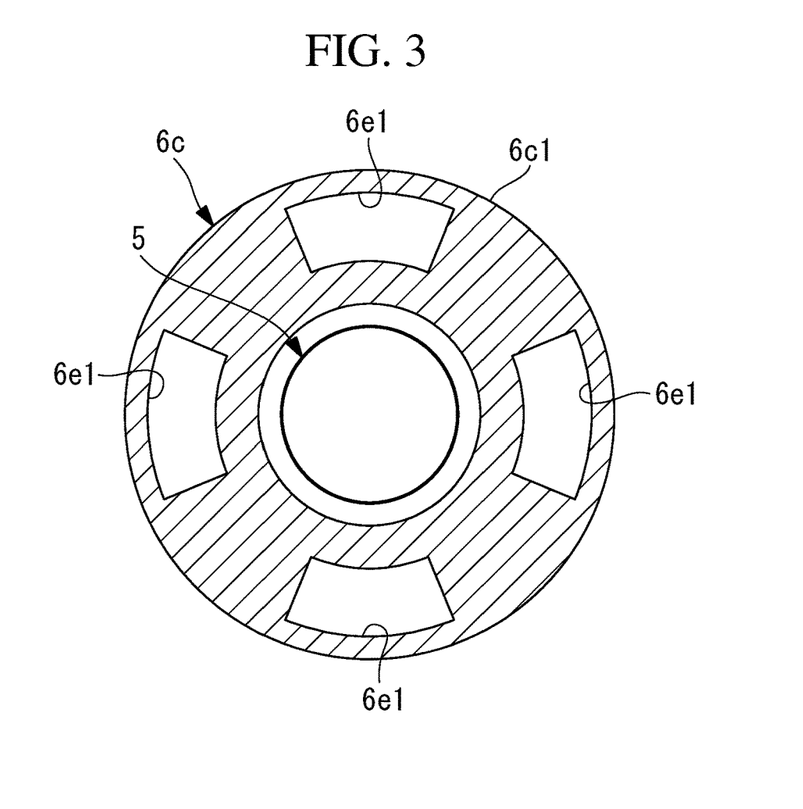
FIG. 3 is a plan view showing a fixed mask included in the observation device in FIG. 1.

The mask 6c includes a flat-plate-shaped fixed mask (illumination-region restricting section) 6c1 and flat-plate-shaped movable masks (illumination-position variable mechanism) 6c2 such that the fixed mask 6c1 and the movable masks 6c2 are disposed on the upper surfaces of the light-diffusing plates 6b so as to be stacked in the plate thickness direction. As shown in FIG. 3, the fixed mask 6c1 has, in a ring-plate-shaped light-blocking member, four fan-shaped openings (emission regions, window sections) 6e1 that transmit illumination light and that are arranged at equally-spaced intervals in the circumferential direction.

Figure 4:
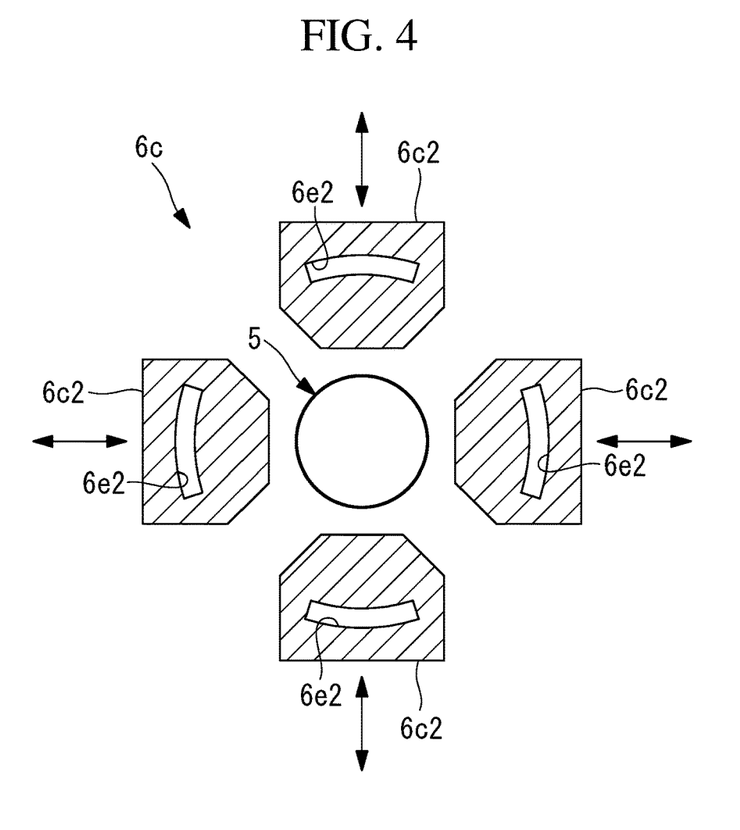
FIG. 4 is a plan view showing one example of movable masks included in the observation device in FIG. 1.

In addition, as shown in FIG. 4, the movable masks 6c2 are arranged at positions for blocking the respective openings 6e1 of the fixed mask 6c1 and each include, in a light-blocking member, a fan-shaped opening (emission region, window section) 6e2 having a smaller dimension in the radial direction than that of the opening 6e1 of the fixed mask 6c1. The movable masks 6c2 are supported so as to be movable in the radial direction of the fixed mask 6c1, and the radial positions of the openings 6e2 can be adjusted by the control unit. By doing so, the positions of the openings 6e2 through which light from the LED light sources 6a is emitted can be adjusted in the radial direction.

In this embodiment, the collimating lenses 6d are arranged above the openings 6e2 at four positions in the circumferential direction around an optical axis A of the objective optical system 5. Preferably, the collimating lenses 6d are arranged at equally-spaced intervals in the circumferential direction so as to form a circle centered on the optical axis A.

In addition, an optical axis B of each of the collimating lenses 6d arranged in the circumferential direction around the optical axis A is disposed closer to the optical axis A of the objective optical system 5 than the position of the corresponding opening 6e2 is. By doing so, the collimating lenses 6d convert, into substantially collimated light, the light that is incident thereon from the LED light sources 6a and also emit the collimated light so as to be tilted in a direction along the optical axis A.

Figure 14:
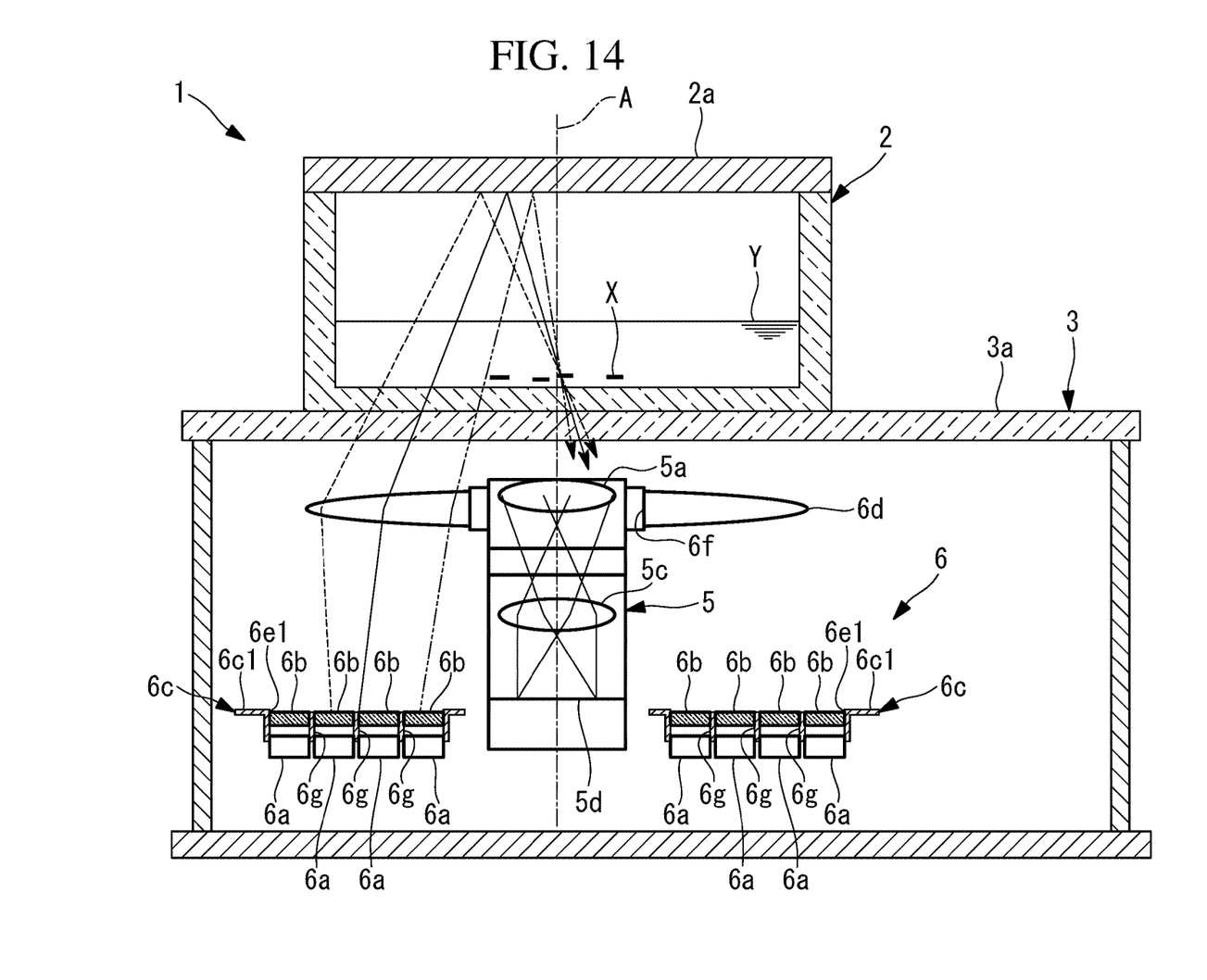
FIG. 14 is a longitudinal sectional view showing a second modification of the observation device in FIG. 1.

Instead, as shown in FIG. 14, a single collimating lens 6d having a through-hole 6f at the center thereof may be provided, in which case the objective optical system 5 may be disposed in the through-hole 6f.

The substantially collimated light that has been tilted and emitted by the collimating lenses 6d is reflected at the top plate 2a of the container 2 disposed above the collimating lenses 6d, passes through a liquid Y and the sample X in the container 2 and the placement table 3a of the stage 3 disposed below the top plate 2a, and then is incident on the objective optical system 5.

Figure 5:
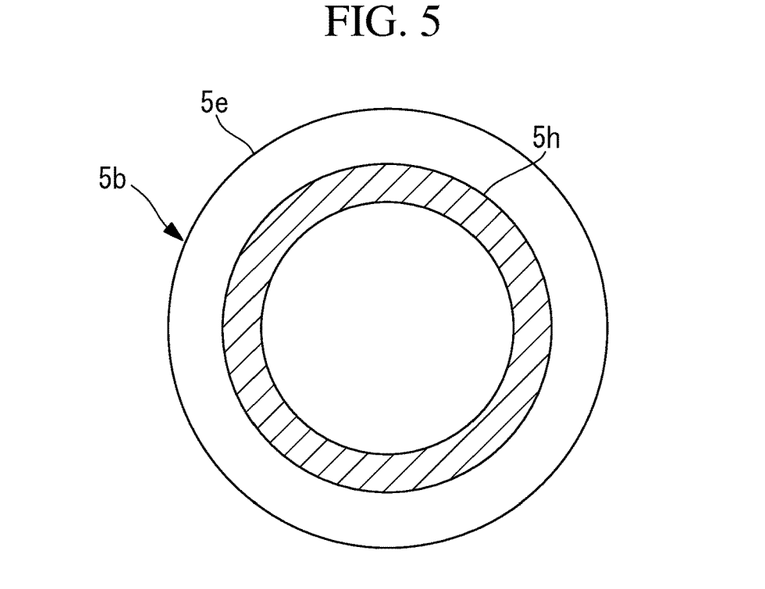
FIG. 5 is a plan view showing one example of a pupil modulation element included in the observation device in FIG. 1.
Figure 6:
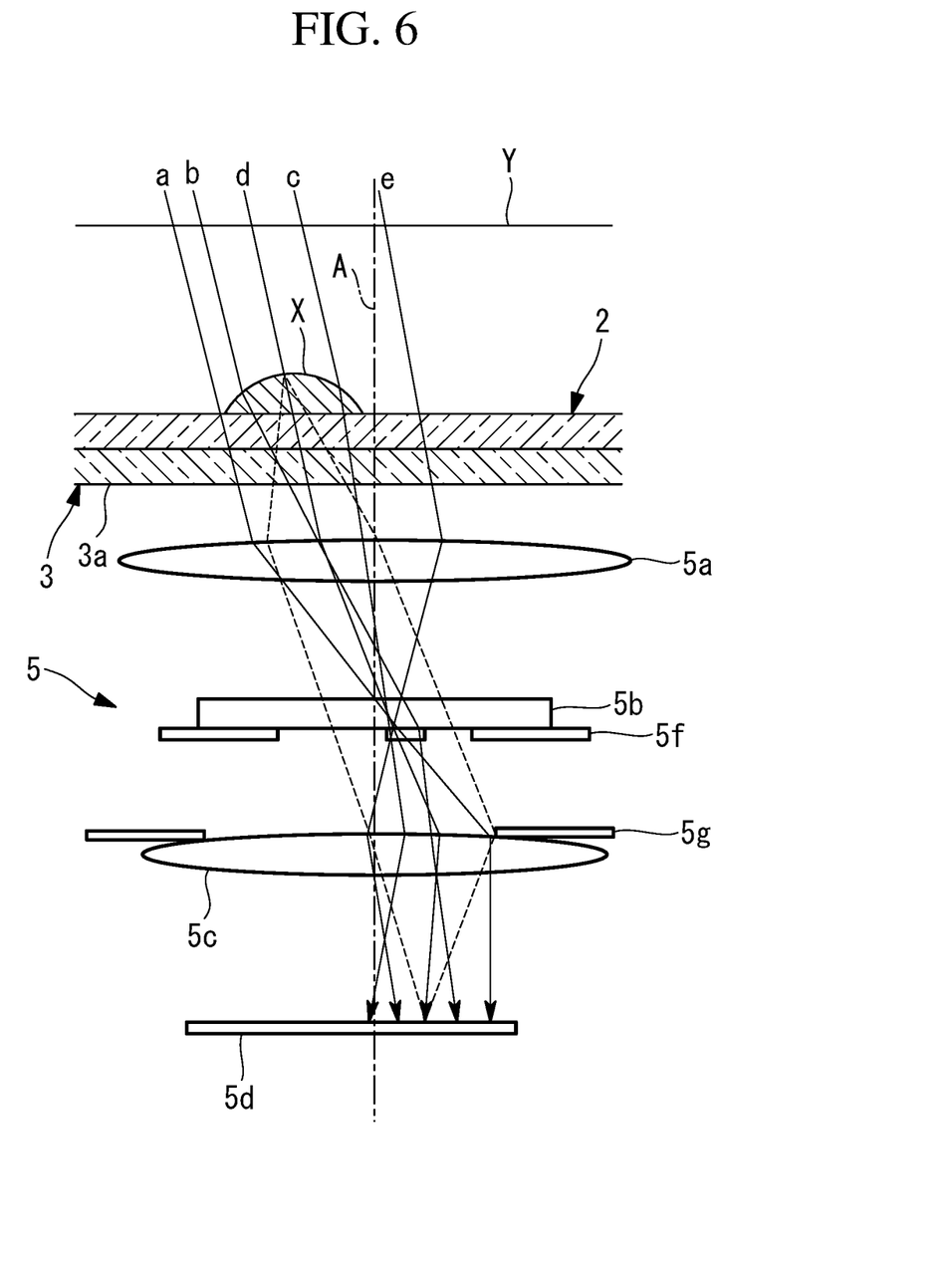
FIG. 6 is a longitudinal sectional view of an objective optical system for illustrating the operation of the observation device in FIG. 1.

As shown in FIG. 6, the objective optical system 5 includes: the objective lens 5a for collecting transmitted light that is incident thereon from thereabove; a pupil modulation element 5b disposed in the vicinity of a pupil plane; a flare diaphragm 5g; an image-forming lens 5c; and an image capturing element 5d. As shown in FIG. 5, the pupil modulation element 5b includes a ring-shaped phase film 5h at a position on the inner side of an aperture stop 5e disposed in the vicinity of the pupil plane, said position being radially away from the center of the pupil plane by a prescribed distance.

The phase film 5h has functions for partially decreasing the transmittance and delaying the phase of light passing therethrough by $\pi/4$ by means of phase modulation. Reference sign 5f is a glass plate for supporting the aperture stop 5e and the pupil modulation element 5b.

The operation of the observation device 1 according to this embodiment with the above-described structure will be described below.

As shown in FIG. 1, illumination light emitted from the LED light sources 6a of the illumination optical system 6 travels upward in the form of light restricted in accordance with the emission regions having a predetermined size as a result of passing through the openings 6e2 of the movable masks 6c2. Thereafter, the light is converted into substantially collimated light when passing through the collimating lenses 6d disposed above the movable masks 6c2 and further travels in the form of light tilted towards the optical axis A of the collimating lenses 6d.

The substantially collimated light travelling upward from the collimating lenses 6d passes through the placement table 3a constituting the stage 3, the bottom surface of the container 2, and the liquid Y, is reflected at the top plate 2a of the container 2, and is converted into oblique illumination that is radiated from obliquely above the sample X onto the sample X disposed obliquely below the top plate 2a. Also, the transmitted light having passed through the interior of the container 2 passes through the bottom surface of the container 2 and the placement table 3a and is then collected by the objective lens 5a. Thereafter, the collected light passes through the pupil modulation element 5b, and then an image of the light is formed by the image-forming lens 5c and is finally acquired by the image capturing element 5d.

In short, illumination light that passes through the sample X from obliquely thereabove and that is formed of substantially collimated light is collected by the objective lens 5a. As shown in FIG. 6, transmitted light having passed through a region in which the sample X is not present is incident on the objective lens 5a without being refracted while retaining the form of substantially collimated light, and hence images of the openings 6e1 and 6e2 of the mask 6c are projected on the pupil modulation element 5b disposed at the pupil plane of the objective lens 5a, are then formed by the image-forming lens 5c, and are finally acquired by the image capturing element 5d.

Transmitted light having passed through a region in which the sample X is present is refracted because the index of refraction of the sample X differs from the index of refraction of the surroundings. In FIG. 6, light rays a and e that do not pass through the sample X and a light ray c that is incident on the sample X orthogonally to the surface of the sample X are not refracted and pass through the phase film 5h of the pupil modulation element 5b, and hence, images whose brightness is reduced by the phase film 5h are formed.

On the other hand, in FIG. 6, light rays b and d that pass through the sample X are split into: diffracted light (indicated by the broken lines in the figure) that is diffracted at the micro-structures in the sample X; and light that is not diffracted (zero-order diffracted light). The zero-order diffracted light reaches the image plane after being attenuated and phase-delayed as a result of passing through the phase film 5h of the pupil modulation element 5b. The light diffracted in the sample X passes through an outer side of the phase film 5h and hence reaches the same position on the image plane as the zero-order diffracted light, without being attenuated and with a phase delay of $\pi/4$.

Figure 7:
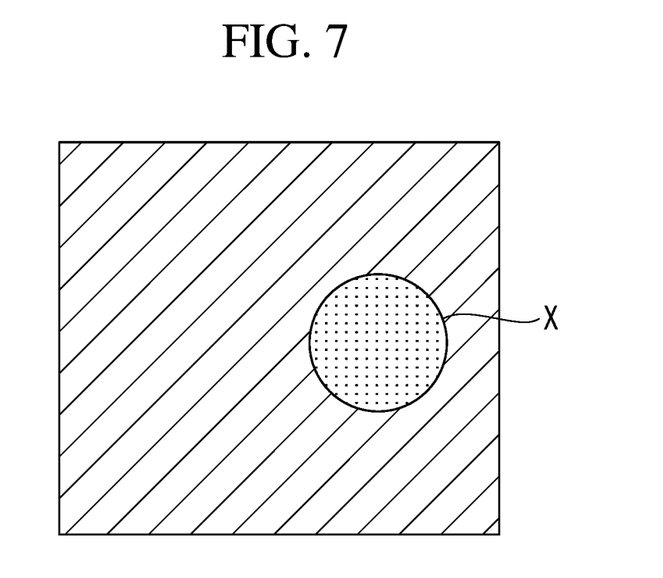
FIG. 7 is a diagram depicting one example of an image acquired by the observation device in FIG. 1.

By doing so, the light that has not passed through the sample X becomes dark as a result of being attenuated by the pupil modulation element 5b, whereas the light that has passed through the sample X forms an image brighter than the light that has not passed through the sample X because both zero-order diffracted light and diffracted light interfere with each other as a result of having the same amount of phase delay (i.e., having a phase difference of 0 between the two). In other words, in the case where the sample X is cells, which have no brightness unevenness and are isotropic, an image that is so bright that the micro-structures in the cells can be observed can be acquired by using diffracted light, as shown in FIG. 7.

Figure 8:
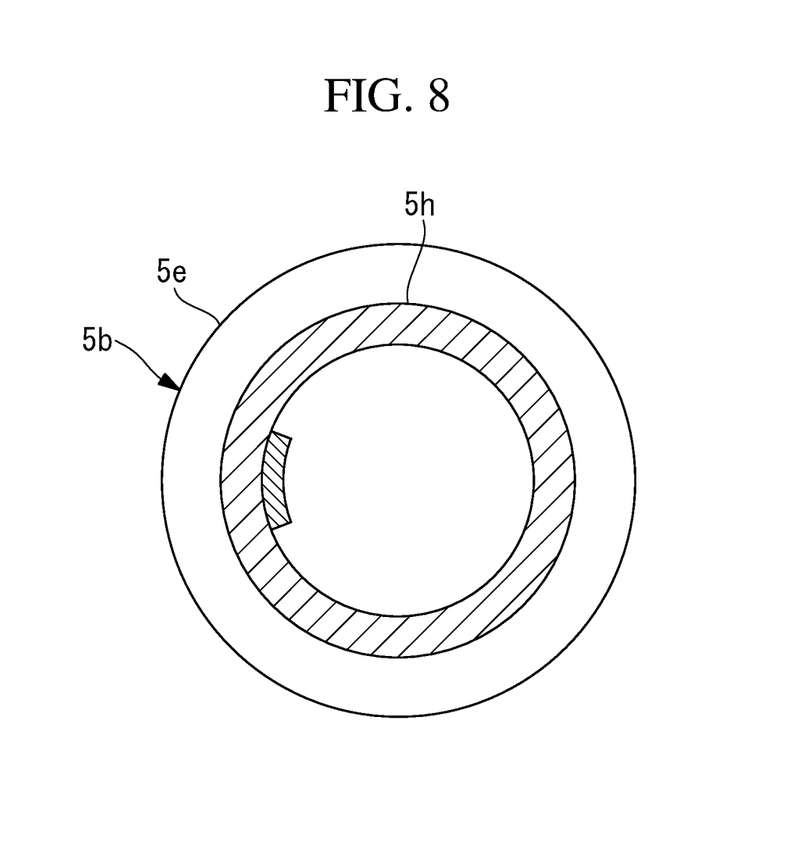
FIG. 8 is a plan view showing one example of a projected image of an opening of a movable mask in the pupil modulation element in the case where the top plate of a container is tilted, in the observation device in FIG. 1.

In this case, if the top plate 2a of the container 2 placed on the stage 3 were tilted or bent for some reason, light that is emitted from an emission region, that is reflected at the top plate 2a, and that is collected by the objective lens 5a without passing through the sample X would not pass through the phase film 5h. For example, as shown in FIG. 8, the projected image (indicated by hatching in the figure) of an emission region in the pupil modulation element 5b deviates from the phase film 5h. Because interference as described above does not occur in such a case, it is not possible to acquire an image in which the sample X is more prominent than the other site.

If this is the case, according to this embodiment, the emission region is moved in the radial direction by moving the movable mask 6c2 in the radial direction relative to the fixed mask 6c1, thereby adjusting the position of light that is reflected at the top plate 2a and that is collected by the objective lens 5a, so that the light passes through the phase film 5h.

Figure 9:
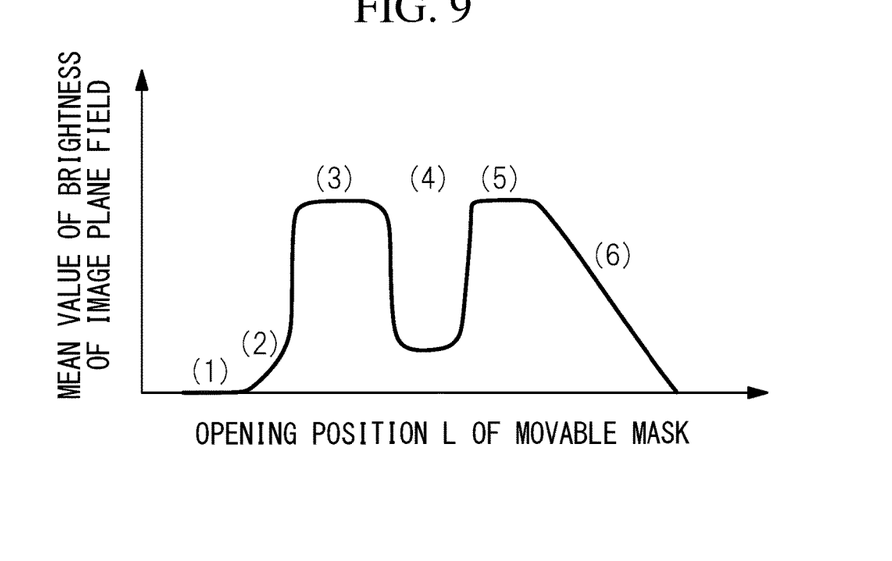
FIG. 9 is a diagram depicting a change in the mean value of the brightness of an image acquired by an image capturing element in the case where a movable mask is moved, in the observation device in FIG. 1.

More specifically, as the movable mask 6c2 is moved in the radial direction, the mean value of brightness of the image acquired by the image capturing element 5d varies as shown in FIG. 9.

In other words:

(1) When the opening 6e2 of the movable mask 6c2 is near the optical axis A, the mean value of the image brightness is low because light is blocked by the frame, etc. of the objective optical system 5;

(2) When the level of light blocking decreases, the mean value of the image brightness increases;

(3) When no light is blocked, the mean value of the image brightness becomes constant;

(4) When the projected image coincides with the phase film 5h, the mean value of the image brightness decreases temporarily;

(5) When the projected image deviates from the phase film 5h, the mean value of the image brightness becomes constant again; and (6) When the opening 6e2 of the movable mask 6c2 is away from the optical axis A, light is blocked by the aperture stop 5e, thus causing the mean value of the image brightness to decrease.

Therefore, the projected image of the emission region can be made to coincide with the phase film 5h by detecting the above-described position in (4) by moving the movable masks 6c2 in the radial direction. Also, as a result of this task being carried out for all of the four movable masks 6c2, the projected images of the emission regions can be arranged so as to overlap the phase film 5h in all directions.

In short, the observation device 1 according to this embodiment, even if the top plate 2a of the container 2 mounted on the stage 3 is tilted or deformed for some reason, affords an advantage in that observation can be performed with a high-contrast image in which the sample X is made more prominent than the other site.

Note that although only the movable masks 6c2 are moved in this embodiment, instead of this, the LED light sources 6a and the mask 6c may be moved in a unified manner. By doing so, light from the LED light sources 6a can be efficiently used.

In addition, although the radial positions of the openings 6e2 of the movable masks 6c2 are adjusted by the control unit in this embodiment, instead of this, manual adjustment may be employed.

Figure 10:
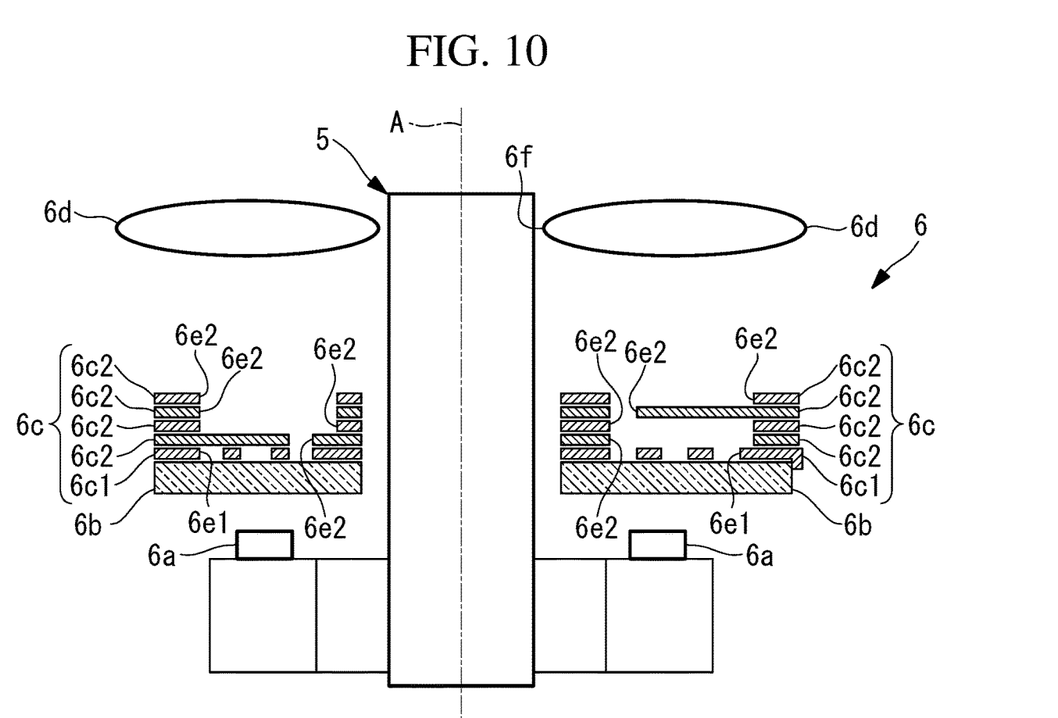
FIG. 10 is a longitudinal sectional view of an illumination optical system showing a first modification of the observation device in FIG. 1.
Figure 11:
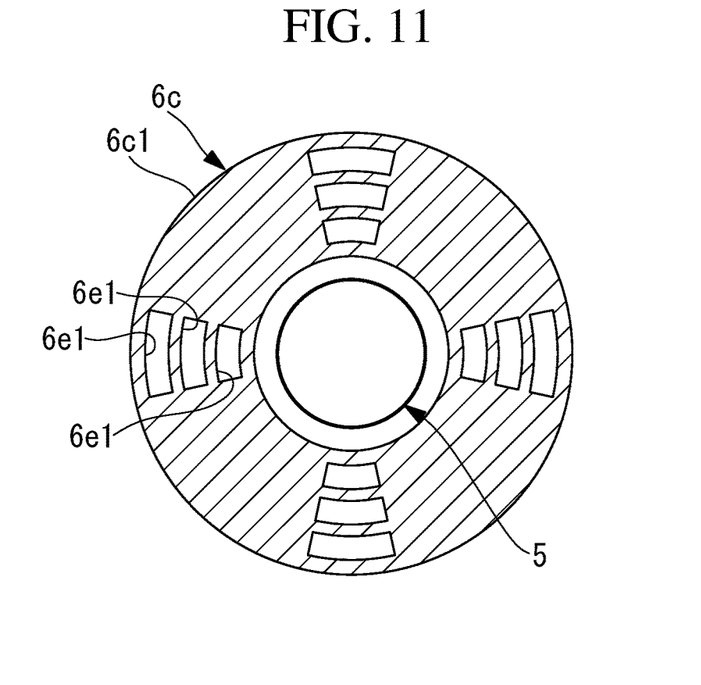
FIG. 11 is a plan view showing one example of a fixed mask included in the illumination optical system in FIG. 10.
Figure 12:
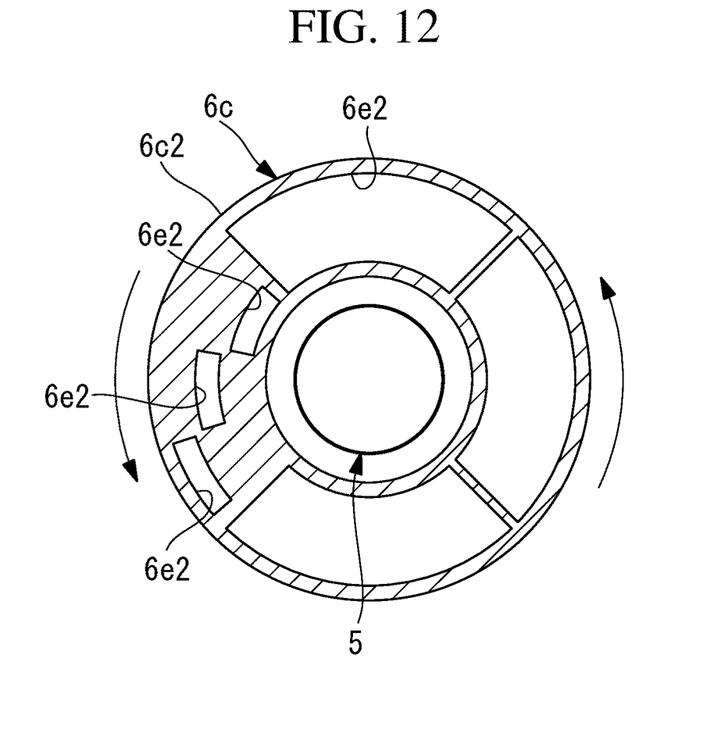
FIG. 12 is a plan view showing one example of a movable mask included in the illumination optical system in FIG. 10.

In addition, although the openings 6e2 are moved in the radial direction by moving the movable masks 6c2 in the radial direction relative to the fixed mask 6c1 in this embodiment, instead of this, one of the openings 6e2 arranged in the radial direction may be selected by rotating the movable mask 6c2 about the optical axis A, as shown in FIGS. 10 to 12.

More specifically, as shown in FIG. 11, the fixed mask 6c1 is provided with a plurality of fan-shaped openings 6e1 at four positions arranged at equally-spaced intervals in the circumferential direction such that the openings 6e1 are spaced apart from one another in the radial direction. Also, as shown in FIG. 12, the movable masks 6c2 are provided with the same number of openings 6e2 as the number of the openings 6e1 of the fixed mask 6c1 at different positions in the circumferential direction and the radial direction. As shown in FIG. 10, the four movable masks 6c2 are arranged in a stacked state and are individually rotatable in such a manner as to correspond to the openings 6e1 at each of the positions in the circumferential direction of the fixed mask 6c1. In short, the movable masks 6c2 result from four masks, each having the shape shown in FIG. 12, being stacked one on another such that the positions of the openings 6e2 thereof are shifted from one another by substantially 90°.

Figure 13:
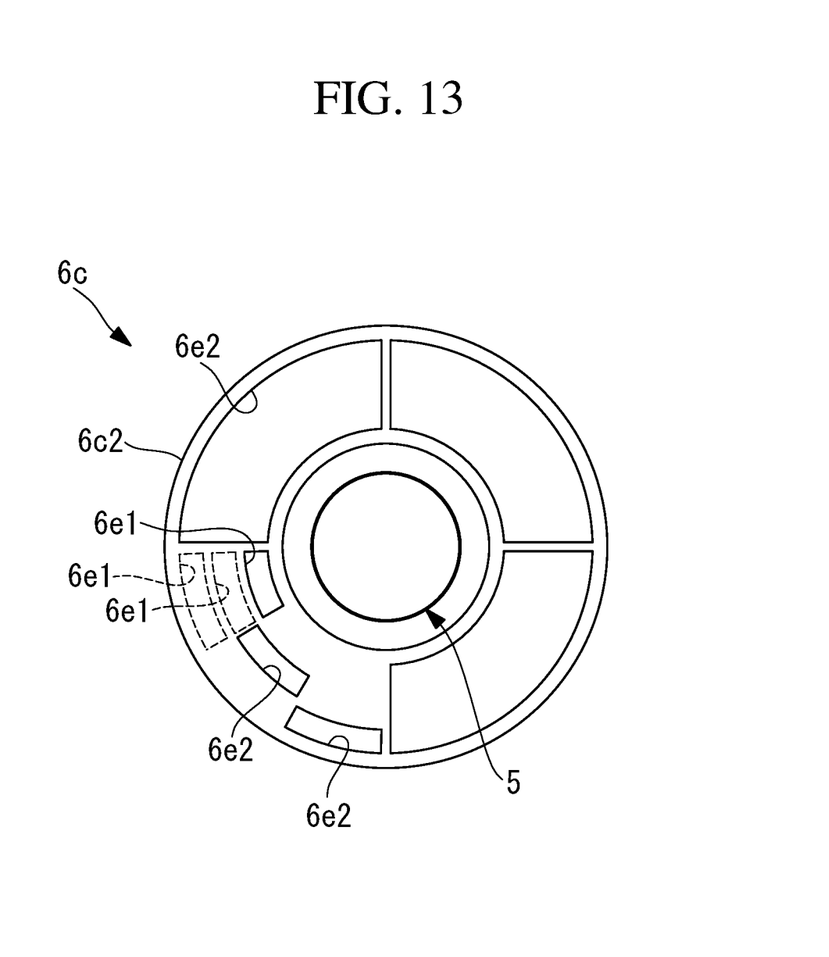
FIG. 13 is a plan view showing a state in which one opening is made to coincide with another by rotating the movable mask in FIG. 12 relative to the fixed mask in FIG. 11.

By rotating the movable mask 6c2 corresponding to the openings 6e1 at each of the positions in the circumferential direction of the fixed mask 6c1, one of the openings 6e2 of the movable mask 6c2 can be made to alternatively correspond to one of the openings 6e1 of the fixed mask 6c1 as shown in FIG. 13, thereby making it possible to move the emission region in the radial direction in the same manner as described above. FIG. 13 shows one example of the positional relationship between the fixed mask 6c1 arranged in one direction in the circumferential direction of the fixed mask 6c1 and the corresponding movable mask 6c2.

In addition, although an emission region is selected by moving the movable mask 6c2 in the above-described embodiment, instead of this, as shown in FIG. 14, the plurality of LED light sources (light source units) 6a may be arranged in the radial direction so as to correspond to the respective openings 6e1 of the fixed mask 6c1 shown in FIG. 10, and the emission region may be moved in the radial direction by selecting an LED light source 6a to be illuminated. A light-blocking wall 6g is provided between radially neighboring openings 6e1 of the fixed mask 6c1 in order to block the entry of light from a neighboring LED light source 6a. In this case, illumination of the LED light sources 6a is controlled by the control unit (illumination-position variable mechanism).

Figure 15:
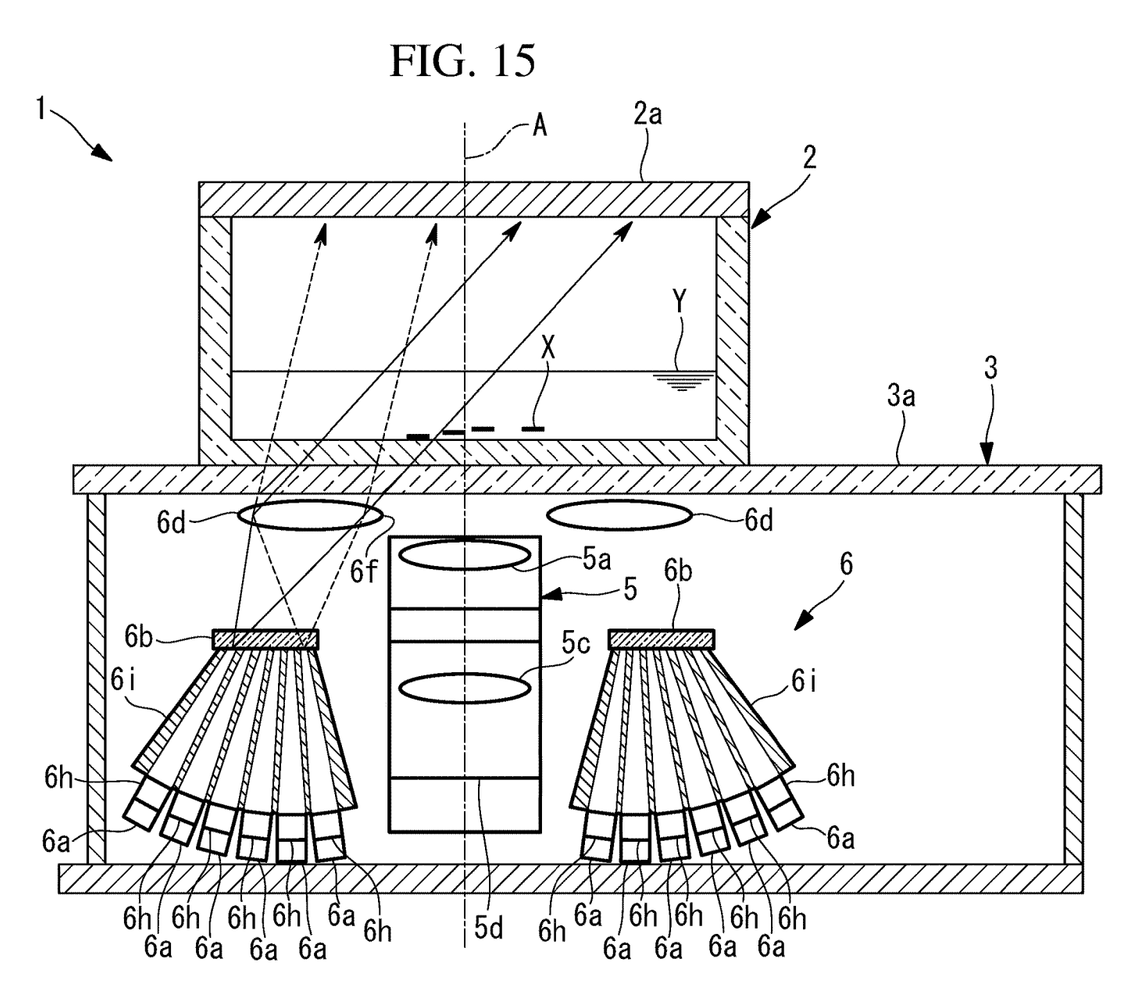
FIG. 15 is a longitudinal sectional view showing a third modification of the observation device in FIG. 1.

In addition, as shown in FIG. 15, the LED light sources 6a arranged in the radial direction may be disposed in a tilted manner so that the optical axes of the LED light sources 6a come closer to one another, a collimating lens 6h may be mounted on each of the LED light sources 6a, and furthermore, a light guide path (illumination-region restricting section, optical connection mechanism) 6i for delimiting the light coming from the corresponding LED light source 6a may be provided between the light-diffusing plate 6b and the collimating lens 6h. In the example shown in FIG. 15, each of the light guide paths 6i has a transverse shape that becomes progressively narrower from the collimating lens 6h towards the light-diffusing plate 6b, so that the emission region in the vicinity of the light-diffusing plate 6b can be small even if the LED light source 6a is large. By doing so, the focal length of the collimating lens 6h can be reduced, which allows a decrease in the distance from the collimating lens 6h to the light-diffusing plate 6b, thus making it possible to suppress the height of the illumination optical system 6.

In this case, the inner surface of the light guide path 6i may be formed of a mirror surface or may be filled with a glass rod. In addition, the diffusion angle may be increased by arranging a negative power lens above the light-diffusing plate 6b.

Figure 16:
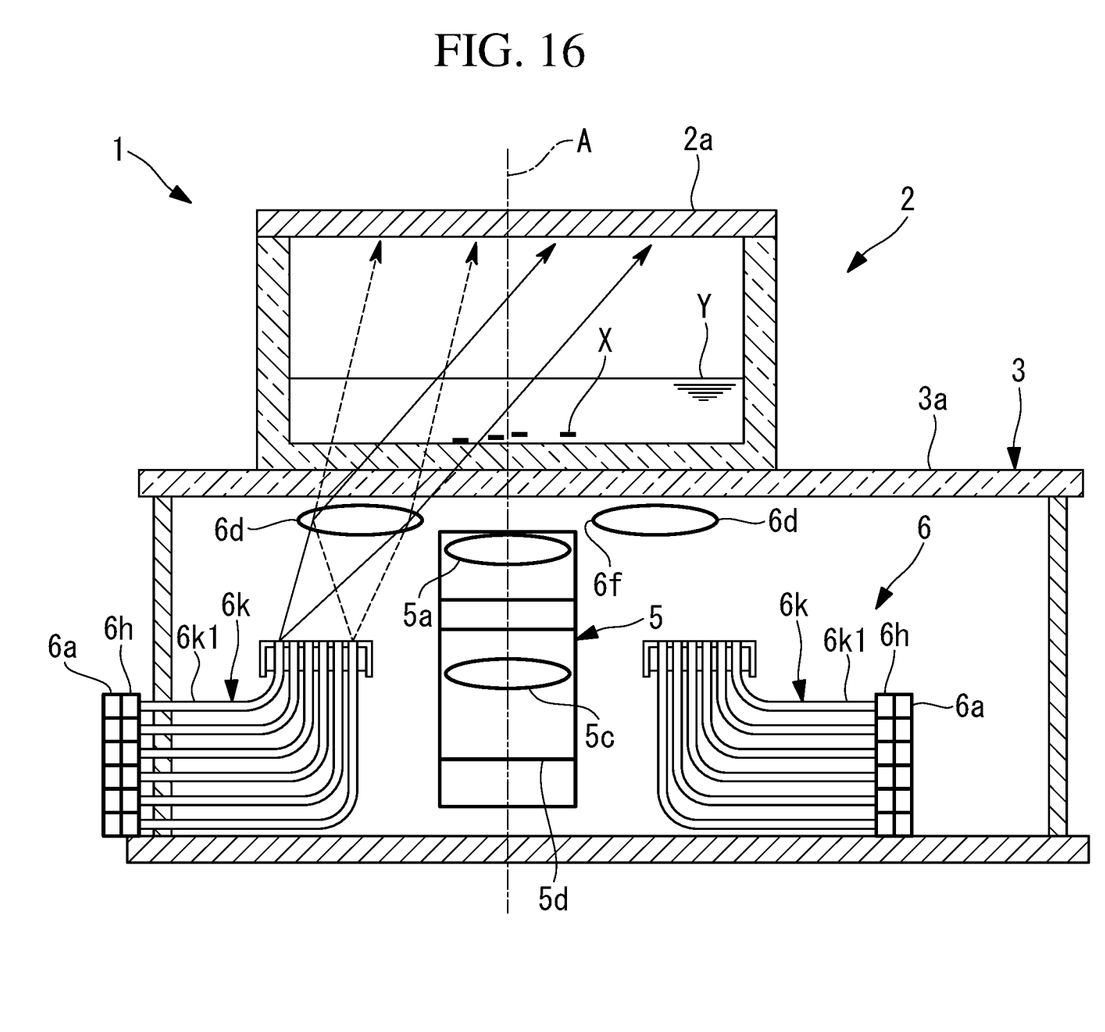
FIG. 16 is a longitudinal sectional view showing a fourth modification of the observation device in FIG. 1.

In addition, instead of the rigid light guide paths 6i, a lightguide fiber bundle (illumination-region restricting section) 6k may be employed, as shown in FIG. 16. In this case, it is not necessary to employ the light-diffusing plate 6b because emitted light widens according to the exit numerical aperture of each of the lightguide fibers (optical connection mechanisms) 6k1 constituting the lightguide fiber bundle 6k. In this case, the LED light sources 6a serving as light sources can be arranged at relatively far positions by enhancing the degree of freedom for arranging the LED light sources 6a, thereby preventing an increase in the temperature of the sample X.

In addition, in each of the above-described embodiments, the emission regions of illumination light are set at four positions in the circumferential direction around the optical axis A of the objective optical system 5. Instead of this, the emission regions of illumination light may be set at any number (one or more) of positions.

In addition, although the phase film 5h is arranged in a ring shape in each of the above-described embodiments, a plurality of fan-shaped phase films 5h may be arranged in accordance with the number of emission regions so as to be spaced apart from each other in the circumferential direction.

In addition, although the phase of light is delayed by $\pi/4$ in the phase film 5h, instead of this, the phase of light may be delayed by $3\pi/4$. By doing so, the phase delay of diffracted light relative to the zero-order diffracted light can be set to $\pi$, and it is possible to acquire an image in which the sample is prominent as a result of the region of the sample X becoming darker than the surroundings thereof due to interference between zero-order diffracted light and diffracted light.

The above-described embodiment also leads to the following invention.

One aspect of the present invention is an observation device including: an illumination optical system configured to emit illumination light to above a sample from below; and an objective optical system configured to acquire an image of transmitted light below the sample in a path different from a path for the illumination optical system, the transmitted light resulting from the illumination light that has been emitted from the illumination optical system, that has been reflected above the sample, and that has passed through the sample, wherein the objective optical system includes, in the vicinity of a pupil plane, a pupil modulation element that partially decreases transmittance and that modulates the phase of light, and the illumination optical system includes a light source, an illumination-region restricting section configured to restrict light from the light source to a particular emission region, and an illumination-position variable mechanism configured to adjust the emission region set by the illumination-region restricting section in a direction orthogonal to an optical axis of the objective optical system.

According to this aspect, the illumination light generated in the light source is emitted to above the sample from below, is reflected above the sample, and then passes through the sample from thereabove to therebelow. An image of the transmitted light having passed through the sample is acquired by the objective optical system that is disposed below the sample and that has a path different from the path for the illumination optical system. Because both the light source and the objective optical system are disposed below the sample, it is possible to observe the subject, such as cells, by acquiring an image of the transmitted light without labelling while still suppressing an increase in size of the device.

In addition, light generated in the light source is radiated on the sample in the form of illumination light restricted to the emission region by the illumination-region restricting section and is incident on the vicinity of the pupil plane of the objective optical system. The pupil modulation element disposed in the vicinity of the pupil plane includes a region having a partially decreased transmittance. Given that, with a setting for causing light that does not pass through the sample to pass through the region having a partially decreased transmittance, the light that has not passed through the sample reaches the image plane not only in an attenuated manner but also in a phase-delayed manner.

On the other hand, the light having passed through the sample is split into light that is diffracted by micro-structures in the sample and light that is not diffracted (zero-order diffracted light). The zero-order diffracted light reaches the image plane after being attenuated and phase-delayed as a result of having passed through the region of the pupil modulation element disposed in the vicinity of the pupil plane, the region having a partially decreased transmittance. The light that has been diffracted in the sample passes through a region of the pupil modulation element in which the transmittance is not decreased and hence reaches the image plane without being much attenuated and with a phase delay of $\pi/4$.

Consequently, the light that has not passed through the sample becomes dark as a result of being attenuated by the pupil modulation element, whereas the light beams having passed through the sample interfere with each other because both the zero-order diffracted light and the diffracted light have the same amount of phase delay and hence the phase difference between the two light beams is zero, thus forming an image brighter than the image of the light that has not passed through the sample. In other words, in the case where the sample is cells, which have no brightness unevenness and are isotropic, it is possible to acquire, by using diffracted light, an image that is so bright that the micro-structures in the cells can be observed.

Also in this case, according to this aspect, even if the reflecting surface disposed above the sample is tilted, it is possible to adjust the emission region of the illumination light so as to satisfy the above-described conditions by adjusting, through the operation of the illumination-position variable mechanism, the emission region set by the illumination-region restricting section in a direction orthogonal to the optical axis of the objective optical system.

In the above-described aspect, the illumination-position variable mechanism may be configured to individually adjust, in the direction orthogonal to the optical axis, a plurality of the emission regions arranged at respective positions spaced apart in a circumferential direction around the optical axis.

By doing so, an image that is made so bright due to illumination light from a plurality of directions that the sample is made prominent can be used to perform observation.

In addition, in the above-described aspect, the illumination-region restricting section may include a mask, and the illumination-position variable mechanism may be configured to move the mask.

By doing so, the emission regions of illumination light can easily be adjusted.

In addition, in the above-described aspect, the illumination-region restricting section may include a flat-plate-shaped fixed mask having a plurality of window sections for transmitting the illumination light in a direction along the optical axis and a plurality of movable masks that are moved relative to the fixed mask in different directions along a surface of the fixed mask.

By doing so, the illumination light can be restricted by the fixed mask so as to pass only through the plurality of window sections, and the movable masks can be moved relative to the fixed mask, thereby easily adjusting the emission regions through which a portion of the illumination light restricted by the fixed mask is emitted.

In addition, in the above-described aspect, the movable masks may be supported so as to be rotatable about the optical axis and may include a plurality of window sections that are arranged at different positions in the circumferential direction around the optical axis such that the window sections are disposed at different positions in a radial direction.

By doing so, it is possible to move an emission region in the radial direction by selecting a window section for emitting the illumination light by rotating the movable mask about the optical axis.

In addition, in the above-described aspect, the light source may include a plurality of light source units, the illumination-region restricting section may be configure to restrict the illumination light so that beams of the illumination light from the light source units are emitted from respective emission regions that differ in the direction orthogonal to the optical axis, and the illumination-position variable mechanism may be configured to alternatively illuminate each of the light source units.

By doing so, it is possible to easily select an emission region for emitting illumination light by selecting a light source unit to be illuminated.

In addition, in the above-described aspect, the illumination-region restricting section may include optical connection mechanisms configured to guide beams of the illumination light from the light source units to the emission regions such that the beams of the illumination light come close to each other.

In order to focus illumination light from each of the light source units by means of a collimating lens and accurately match a projected image of the illumination light to the pupil plane of the objective optical system, it is necessary to secure a sufficiently large focal length of the collimating lens. For this reason, it is inevitable that the height dimension from the light source unit to the corresponding emission region becomes large. However, providing an optical connection mechanism allows the emission region to be closer to the corresponding light source unit even if the light source unit is large in size, thereby making it possible to reduce the height dimension and achieve a compact configuration.

In addition, in the above-described aspect, the optical connection mechanisms may be configured to delimit beams of the illumination light from the light source units to prevent the beams of the illumination light from being mixed with each other.

By doing so, when a light source unit is selected, it is possible to emit illumination light only from the emission region corresponding to the selected light source unit.

In addition, in the above-described aspect, the optical connection mechanisms may include lightguide fibers.

By doing so, the illumination light emitted from each of the light source units is guided by the lightguide fiber and is emitted from an emission region having a smaller area than the light source unit. The height dimension can be reduced by bending the lightguide fibers, thereby achieving a compact configuration.

REFERENCE SIGNS LIST

1 Observation device
5 Objective optical system
5b Pupil modulation element
6 Illumination optical system
6a LED light source (light source, light source unit)
6c1 Fixed mask (illumination-region restricting section)
6c2 Movable mask (illumination-position variable mechanism)
6e1 Opening (emission region, window section)
6e2 Opening (emission region, window section)
6i Light guide path (illumination-region restricting section, optical connection mechanism)
6k Lightguide fiber bundle (illumination-region restricting section)
6k1 Lightguide fiber (optical connection mechanism)
A Optical axis
X Sample

The invention claimed is:

1. An observation device comprising:
an illumination optical system comprising a light source configured to emit illumination light to above a sample from below the sample; and
an objective optical system comprising an image sensor configured to acquire an image of the sample provided by transmitted light through the sample, wherein a path of the transmitted light from the sample to the image sensor is different from a path for the illumination light from the light source to the sample, the transmitted light resulting from the illumination light that has been emitted from the illumination optical system, that has been reflected from a reflective surface above the sample, and that has passed through the sample,
wherein the objective optical system comprises, in a vicinity of a pupil plane, a pupil modulation element that partially decreases transmittance and that partially modulates a phase of the transmitted light,
the illumination optical system comprises a mask configured to restrict the illumination light from the light source to an emission region; and
the mask is movable to adjust the emission region of the illumination light in a direction orthogonal to an optical axis of the objective optical system.

2. The observation device according to claim 1, wherein the mask is configured to individually adjust, in the direction orthogonal to the optical axis, each of a plurality of emission regions arranged at respective positions spaced apart in a circumferential direction around the optical axis.

3. The observation device according to claim 1, wherein the mask comprises:
a flat-plate-shaped fixed mask having a plurality of first openings for transmitting the illumination light in a direction toward the optical axis, and a plurality of movable masks that are movable relative to the fixed mask along a surface of the fixed mask.

4. The observation device according to claim 3, wherein:
the movable masks are supported so as to be rotatable about a rotational axis parallel to the optical axis; and
the movable masks comprise a plurality of second openings that are arranged at different positions in a circumferential direction around the optical axis such that the second openings are disposed at different positions in a radial direction.

5. The observation device according to claim 1, wherein the light source comprises a plurality of light source units, the mask is configured to restrict the illumination light so that beams of the illumination light from the plurality of light source units are emitted from respective emission regions that differ in the direction orthogonal to the optical axis, and
the mask is configured to alternatively illuminate each of the light source units.

6. The observation device according to claim 1, wherein the mask is continuously movable between first and second positions.

7. The observation device according to claim 1, wherein the mask is configured to be discretely varied at two or more predetermined positions.

8. The observation device according to claim 1, wherein the pupil modulator comprises an aperture stop having a ring-shaped phase film disposed at a position on an inner side of the aperture stop in the vicinity of the pupil plane.

9. The observation device according to claim 8, wherein the phase film is configured to attenuate light that has not passed through the sample and to interfere with a zero-order diffracted light with other diffracted light by having a same amount of phase delay.

10. An observation device comprising:
an objective optical system comprising at least one lens and an image sensor configured to acquire an image of a sample, the objective optical system being arranged below the sample in a direction of light and being arranged on an optical axis;
an illumination optical system comprising one or more light sources configured to emit illumination light to above a sample from below the sample, the illumination optical system being disposed radially outward from the optical axis, wherein the illumination optical system comprising a mask configured to restrict the illumination light to be directed obliquely relative to the optical axis such that the illumination light is reflected by a reflective surface above the sample, passes through the sample and is incident on the objective optical system;
wherein the objective optical system comprises a phase change material configured to partially decrease transmittance and partially modulates a phase of light transmitted to the image sensor; and
the mask is movable to adjust an emission region of the illumination light in a direction orthogonal to the optical axis of the objective optical system.

11. The observation device according to claim 10, wherein the one or more light source comprises a plurality of light sources, and
the plurality of light sources are configured to alternatively emit the illumination light from respective emission regions that differ in one or more of a direction orthogonal to the optical axis of the objective optical system and an angle relative to the optical axis of the objective optical system.

12. The observation device according to claim 10, further comprising a stage for holding the sample, the objective optical system being disposed within an interior of the stage and the one or more light sources being disposed outside of the interior of the stage, wherein the illumination light emitted by the one or more light sources is directed to within the interior of the stage.

* * * * *